United States Patent
King et al.

(10) Patent No.: US 6,974,282 B2
(45) Date of Patent: Dec. 13, 2005

(54) TOOLHOLDER FOR SMALL SIZE GROOVING AND TURNING INSERT

(75) Inventors: Ken King, Fort Wayne, IN (US); Doug DeWitt, Columbia City, IN (US); Jeff Frank, Fort Wayne, IN (US); Eric Bustos, Huntington, IN (US); Dave Coleman, Spencerville, IN (US)

(73) Assignee: Kaiser Tool Company, Fort Wayne, IN (US)

( * ) Notice: Subject to any disclaimer, the term of this patent is extended or adjusted under 35 U.S.C. 154(b) by 44 days.

(21) Appl. No.: 10/218,506

(22) Filed: Aug. 14, 2002

(65) Prior Publication Data
US 2004/0101372 A1  May 27, 2004

(51) Int. Cl.⁷ ........................... B23P 15/28; B23B 29/00
(52) U.S. Cl. .................. 407/107; 407/108; 407/66; 407/101; 407/103; 407/117
(58) Field of Search ................. 407/107, 108, 407/117, 66, 67, 101, 103

(56) References Cited

U.S. PATENT DOCUMENTS

| | | |
|---|---|---|
| 513,954 A | 1/1894 | Owen |
| 1,219,097 A | 3/1917 | Gibbs |
| 1,395,262 A | 11/1921 | Curtin |
| 2,480,226 A | 8/1949 | Deibert |
| 2,779,992 A * | 2/1957 | Hayes ..................... 407/107 |
| 3,686,729 A | 8/1972 | Cochran |
| 3,704,497 A | 12/1972 | Derwin |
| 3,754,309 A | 8/1973 | Jones et al. |
| 3,758,927 A | 9/1973 | Stein |
| 3,805,350 A | 4/1974 | Stein |
| 3,981,058 A | 9/1976 | Roos et al. |
| 4,028,782 A | 6/1977 | Stansak |
| 4,669,924 A | 6/1987 | Benson |
| 4,832,541 A | 5/1989 | Noguchi et al. |
| 4,973,204 A | 11/1990 | Mihic |
| 5,076,738 A | 12/1991 | Pano et al. |
| 5,159,863 A * | 11/1992 | Simpson, III ............... 82/1.11 |
| 5,382,119 A | 1/1995 | Mihic |
| D370,019 S * | 5/1996 | Stewart .................... D15/140 |
| 5,638,728 A | 6/1997 | Smith et al. |
| 6,000,885 A | 12/1999 | Erickson |
| 6,033,158 A | 3/2000 | Fountaine |

* cited by examiner

Primary Examiner—Willmon Fridie, Jr.
(74) Attorney, Agent, or Firm—Welsh & Katz, Ltd.

(57) ABSTRACT

A toolholder for a small-size insert having a shoulder for use with a machine tool for grooving, boring and turning has a substantially planar surface portion in an end portion which defines at least one insert-receiving recess extending inwardly into the body of the toolholder, and the end portion defining at least one abutment surface against which the shoulder of the insert may abut to readily orient and rapidly and readily secure the insert in the toolholder.

22 Claims, 3 Drawing Sheets

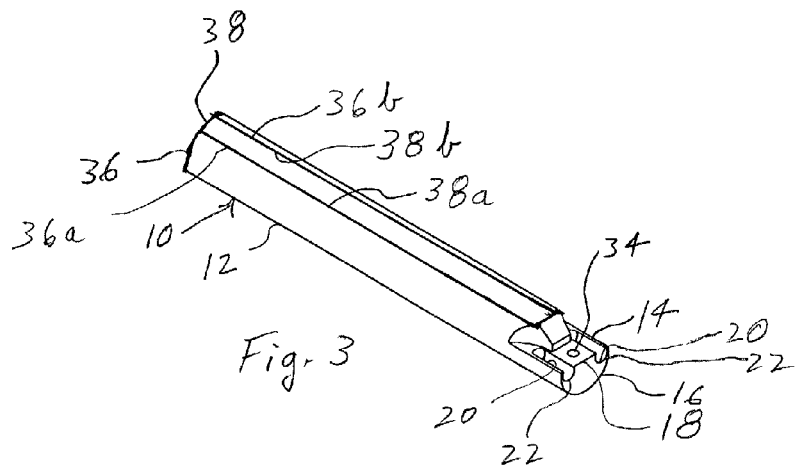
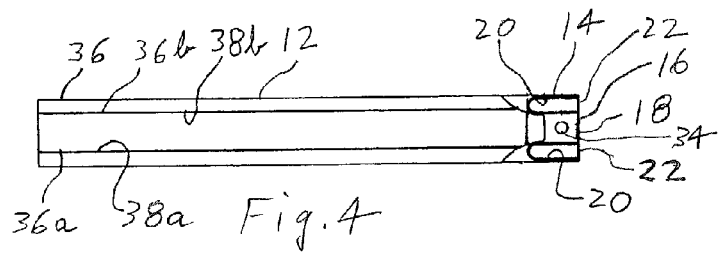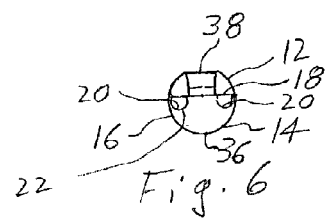
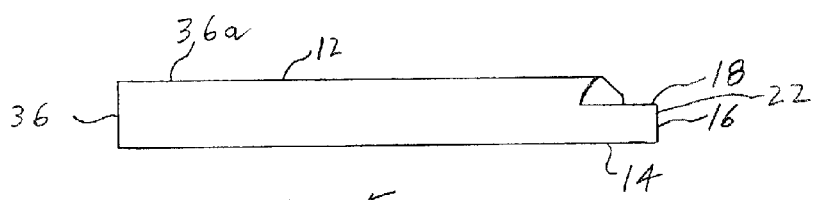
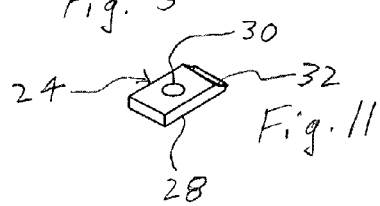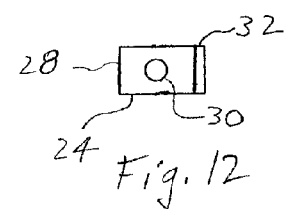
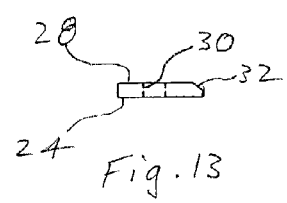

TOOLHOLDER FOR SMALL SIZE GROOVING AND TURNING INSERT

BACKGROUND OF THE INVENTION

1. Field of the Invention

The present invention relates to cutting tools, namely toolholders for inserts for machine tools, and more particularly, to toolholders for small size inserts for grooving and turning.

2. Description of Related Art

The art of cutting grooves in a workpiece using a cutting tool, and particularly using an insert secured in a toolholder is well known. The use of an insert in a toolholder for turning, i.e., removing portions of material from a rotating workpiece by causing the insert to traverse along a portion of the longitudinal surface of the workpiece while the insert is sequentially advanced into the surface of the workpiece, is also known.

In one method of securing the insert during its use, particularly for grooving, cutting or threading, the insert is clamped adjacent one side of a toolholder. In this arrangement the toolholder has a nest or pocket formed by a bottom wall and a side wall, and the insert is held in position by a top clamp. Such an arrangement is illustrated in U.S. Pat. No. 3,754,309, issued to Jones et al. on Aug. 28, 1973.

Turning, for example in a lathe, advantageously is performed by traversing and removing material from the workpiece in both longitudinal directions. However, attempts to use the same insert within a holder for both grooving and turning, especially during turning in both directions, presents problems in securely and accurately maintaining the insert in position during these operations. In particular, during turning, and most especially upon the workpiece being traversed in the direction outwardly from that side of the holder to which the insert is clamped, the outward end of the insert held by a clamp to the toolholder tends to slip or rotate sideways due to the lateral force of the workpiece on the outward end of the insert. This is particularly the case where the bottom insert supporting surface of the holder is planar and perpendicular to the sides as in U.S. Pat. No. 3,754,309. Even where the bottom insert supporting surface of the holder is not planar, but is angled as in U.S. Pat. No. 6,000,885, issued to Erickson on Dec. 14, 1999, the insert tends to slip or rotate from the holder.

Attempts have been made to overcome the tendency of the insert to slip or rotate in the holder due to lateral force on the insert, for example by forming a diagonal notch in the insert and angling the clamp element to engage the notch and by forming recessed angled portions in the top and/or bottom surfaces of the insert, as in U.S. Pat. Nos. 3,754,309 and 6,000,885. However, such attempts have generally been imperfect to counter the force exerted on the insert as explained in U.S. Pat. No. 6,000,885. Furthermore, the attempts to date have not been applicable to small-size inserts. Small-size inserts are inserts having grooving widths in the range of from about 0.004 inch to about 0.125 inch and a body diameter of approximately 0.125 inch. Due to the small size of these inserts, it is impractical to attempt to form diagonal notches and recessed portions in the shank portion of the insert, particularly where the insert is a carbide tool insert.

In another attempt to provide a small-shank tool, and thus one or more small-size inserts, for an automatic lathe or like turning machine, a round or circular cross-sectioned elongated shank or toolholder was provided to support a pair of rhomboidal-shaped inserts, with fasteners passing through the inserts and into the toolholder to hold the inserts to the shank, as in U.S. Pat. No. 6,033,158. However, the support provided for the inserts is limited in size and orientation, i.e., the inserts extend transversely to the axis of the shank, and depend upon fasteners passing through the inserts to resist the forces encountered during cutting, grooving and turning operations. In small-size inserts it is impractical to have an aperture formed therein to receive, if it provided with cause a fastener, a weakened area, particularly if the insert is a carbide tool insert.

In still another attempt to provide inserts and toolholders which can resist the dislodging of the insert from the holder upon encountering cutting, grooving and turning forces, an insert of generally rectangular cross-section is provided with concave upper and lower clamping surfaces which cooperate with concavely-shaped clamping surfaces of a toolholder, as in U.S. Pat. No. 5,076,738. However, the generally rectangular-shaped inserts having arcuate clamping surfaces do not lend themselves for use as small-size inserts in which it would be extremely difficult to form concave upper and lower clamping surfaces, particularly where the insert is a carbide tool insert.

Thus, there exists a need for toolholders for small-sized inserts which are configured to resist forces exerted on the insert, particularly during turning.

SUMMARY OF THE INVENTION

It is an object of the present invention to provide a toolholder for a small-size insert in which the insert can be securely held within the holder even when encountering lateral forces which tend to move the insert out of position with respect to the holder.

It is another object of the invention to provide a toolholder with which the small-size insert does not require apertures, recesses, notches or concave surfaces to be formed therein in order to be securely held in position during grooving and turning.

Another object of this invention is to provide a toolholder with means to easily and accurately position the insert within a toolholder.

It is still another object of this invention to provide a toolholder for small size inserts which can be securely held in position in the toolholder during grooving, cutting, as well as during turning in both directions along the workpiece.

These and other objects and advantages of the present invention will be apparent from the following description.

In accordance with the present invention, a toolholder for a small-size insert having a shoulder to position the insert is provided for use with a machine tool for grooving, boring and turning. The toolholder comprises an elongated body having a transverse end, an end portion including the transverse end, and the end portion defining a substantially planar surface portion extending inwardly from the transverse end of the body and defining at least one insert-receiving recess which extends inwardly into the shaped body. Preferably the at least one insert-receiving recess is arcuate. The end portion further defines at least one abutment surface for positioning an insert in the recess with the shoulder of the insert abutting the abutment surface of the holder. The toolholder of the present invention additionally preferably has means for securing the insert to the toolholder.

In one embodiment of the toolholder the at least one insert-receiving recess in the substantially planar surface portion of the end portion extends inwardly into the body of the toolholder longitudinally with respect to the elongation of the body from the transverse end of the body. In another embodiment the end portion defines a plurality of spaced apart insert-receiving recesses in the substantially planar surface portion, the recesses extending inwardly into the body longitudinally from the transverse end. In these embodiments, the insert can be readily positioned in the at least one recess, or in one of the plurality of recesses, with the shoulder of the insert placed against the abutment defined by the end portion.

In another embodiment, the at least one insert-receiving recess in the substantially planar surface portion of the body of the toolholder extends transversely of the elongated body and is spaced from the transverse end. Preferably, the recess in this embodiment extends from one side surface of the body to the other side surface, the side surfaces being opposed. In this embodiment, the insert can be placed in the recess with the shoulder of the insert abutting one of the side surfaces and the cutting portion of the insert extending outwardly from that side surface.

The means for securing an insert to the toolholder in accordance with the present invention may comprise a clamping device whereby the insert is clamped to the toolholder.

In accordance with the present invention, the toolholder is adapted to receive an insert having a shoulder extending outwardly of the body of the insert, whereby the shoulder of the insert abutting the body of the toolholder permits the insert to be quickly, easily and accurately positioned in the toolholder. In this manner, the toolholder, with the shoulder of the insert abutting the end portion of the toolholder, provides for self orienting the insert with respect to the toolholder, particularly where the body of the insert is arcuate in cross-section and the at least one insert-receiving recess of the toolholder is arcuate in cross section. Further, when the insert is secured to the toolholder by the securing means, particularly by a clamping device, the toolholder provides rigidity with respect to insert and affords repeatability in positioning and orienting upon changing inserts with the same toolholder.

BRIEF DESCRIPTION OF THE DRAWING

FIG. 3 is a perspective view of a toolholder in accordance with the embodiment of the present invention shown in FIG. 1;

FIG. 4 is a top view of the toolholder of FIG. 3;

FIG. 5 is a left side view of the toolholder of FIG. 3;

FIG. 6 is a front end view of the toolholder of FIG. 3;

FIG. 11 is a perspective view of a clamping device which can be used with a toolholder of the present invention;

FIG. 12 is a top view of the clamping device of FIG. 11; and

FIG. 13 is a right side view of the clamping device of FIG. 11.

DESCRIPTION OF THE PREFERRED EMBODIMENT

Figure 1:
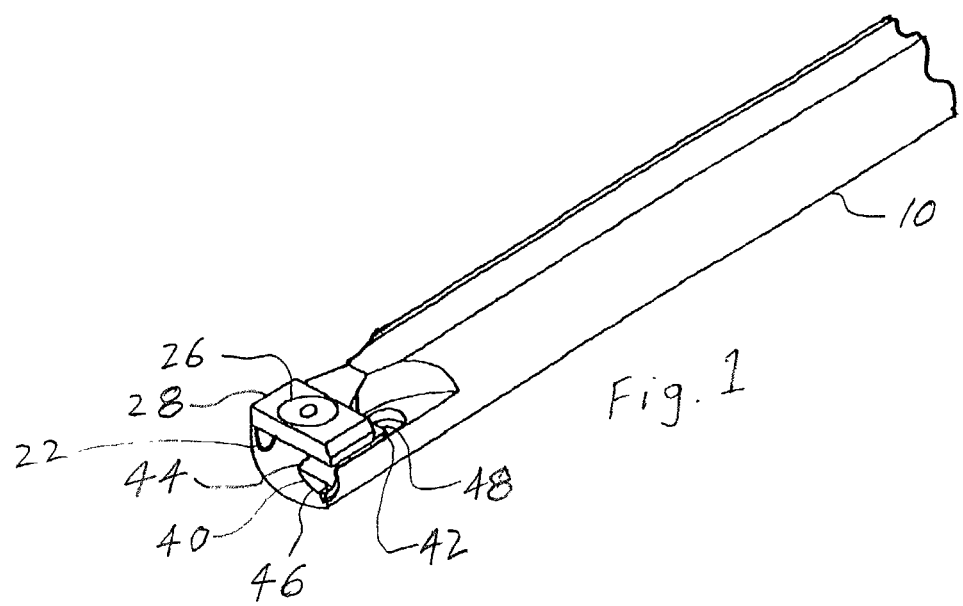
FIG. 1 is a fragmentary perspective view of one embodiment of a toolholder in accordance with the present invention with an insert mounted and clamped to the toolholder and secured thereto.
Figure 2:
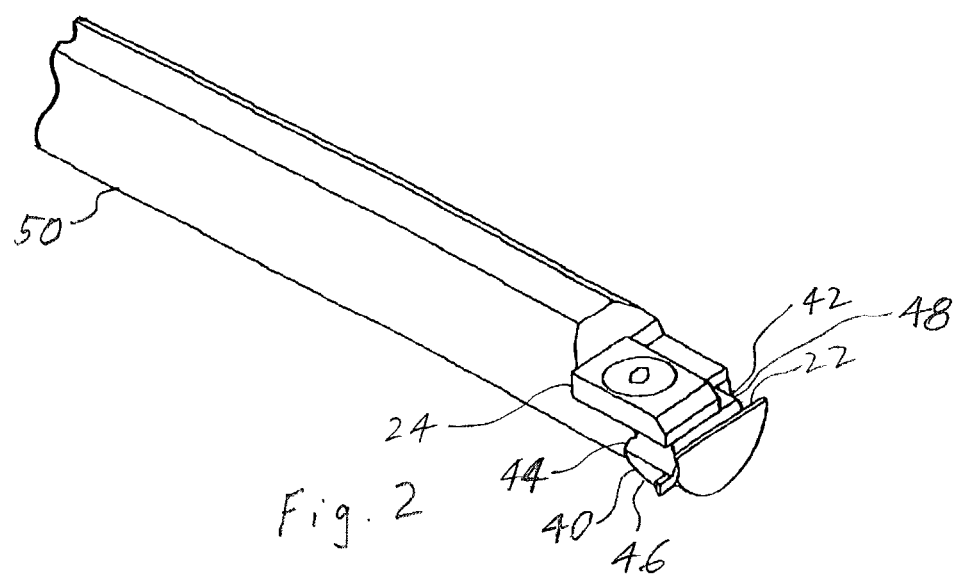
FIG. 2 is another fragmentary perspective view of another embodiment of a toolholder in accordance with this invention with an insert mounted to the toolholder taken from a different orientation.
Figure 7:
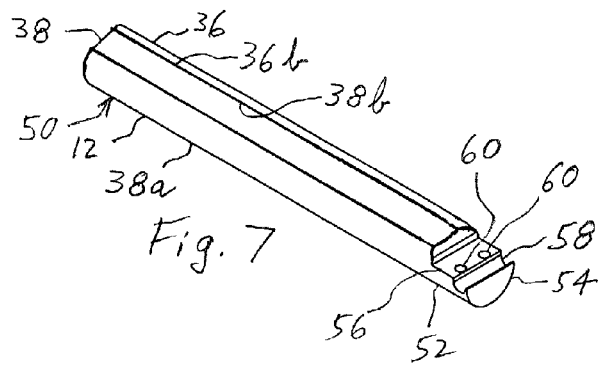
FIG. 7 is a perspective view of another toolholder in accordance with the embodiment of the present invention as shown in FIG. 2.
Figure 8:
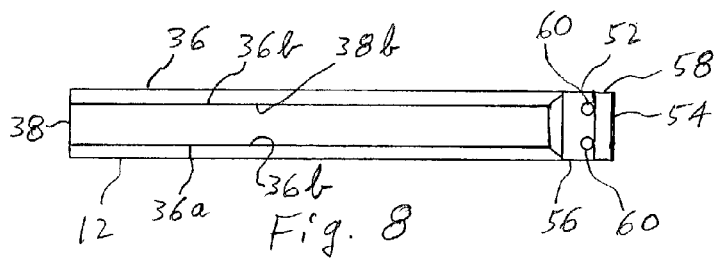
FIG. 8 is a top view of the toolholder of FIG. 7.
Figure 10:
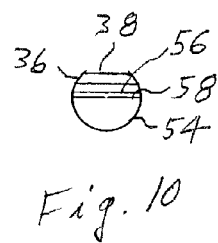
FIG. 10 is a front end view of the toolholder of FIG. 7.
Figure 9:
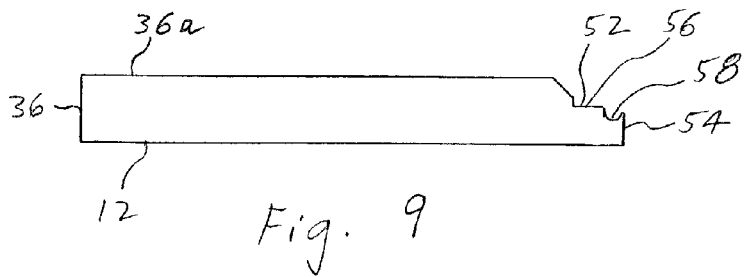
FIG. 9 is a right side view of the toolholder.

In a preferred embodiment of the present invention as illustrated in FIGS. 3–6, and as illustrated in FIG. 1 with an insert mounted to the toolholder, a toolholder of this invention is provided having an elongated body 12 with an end portion 14 including a transverse end 16. End portion 14 of body 12 defines a substantially planar surface portion 18 which extends inwardly into body 12, and further defines at least one insert-receiving recess 20 extending inwardly into body 12. The at least one insert-receiving recess 20 in end portion 14 is preferably arcuately-shaped. End portion 14 of body 20 further defines at least one abutment surface 22 against which the shoulder of an insert may abut to position the insert with relation to body 12 and the at least one recess 20.

The toolholder 10 of this embodiment includes a clamping lever 24 and a fastener 26, which serves as means for securing an insert to the toolholder. Clamping lever 24, as illustrated in FIG. 1 and FIGS. 11–13, comprises a generally planar rectangular-shaped plate 28 with an aperture 30 therein for passage of fastener 26 therethrough. Fastener 26 may be a machine screw as illustrated in FIG. 1. Plate 28 may optionally have one side edge 32 truncated. The means for securing an insert to the toolholder of the present invention also desirably includes a threaded opening 34 in substantially planar surface portion 18 adapted to threadingly receive fastener 26.

Body 12 may have a first generally arcuate surface portion 36 extending along its length and forming a pair of opposing longitudinal edges 36a, 36b; and a second substantially planar portion 38 along the length of the body forming a pair of opposing longitudinal edges 38a, 38b, each of which are contiguous with one longitudinal edge 36a, 36b, respectively, of the portion 36. Such a configuration of body 12 is useful where the machine tool is adapted to receive a toolholder having an arcuate longitudinal surface and a planar longitudinal surface.

In the embodiment shown in FIGS. 1 and 3–6, the end portion 14 of toolholder 10 defines a pair of spaced apart insert receiving recesses 20, 20, extending inwardly into body 12 longitudinally from transverse end 14, and which preferably are arcuately-shaped. A small-size insert 40 also having a body 42 with a first generally arcuate surface portion 44 and a shoulder 46 extending outwardly from body 42 may be positioned in one of the recesses 20, 20 of the toolholder 10, with the shoulder 46 of the insert abutting one of the abutment surfaces 22. Insert 40 is oriented and secured to toolholder 10 by placing clamping lever 24 over a second substantially planar portion 48 of body 42 of insert 20 and abutting substantially planar surface portion 18 which causes insert 40 to orient itself by rotating along its generally arcuate surface portion 44 within recess 20 until insert 40 is accurately and repeatably positioned along its x- and y-axes with respect to the recess. Insert 40 is oriented accurately and repeatably along the z-axis with respect to recess 20 by its shoulder 46 abutting the abutment surface 22 corresponding with the recess 20 in which the insert 40 is positioned. Fastener 26 is then passed through aperture 30 in clamping lever plate 28 and threaded into threaded opening 34 and upon tightening fastener 26 therein, insert 40 is secured in toolholder 10.

In the foregoing manner, a small-size insert 40 is rigidly and securely held in toolholder 10 for use with a machine tool, and is particularly useful for grooving and turning, especially for turning of a workpiece by traversing the workpiece in both directions along the longitudinal surface of the workpiece. The small-size insert 40 may be positioned and secured in either recess 20, as desired.

In another embodiment of this invention as illustrated in FIGS. 2 and 7–10, toolholder 50 is provided with an elongated body 12, as in the embodiment of FIGS. 1 and 3–6, but with a substantially planar surface portion 52 extending inwardly into body 12. Elements in this embodiment are referenced by numerals of FIGS. 1 and 3–6 where the elements are identical to those in the first embodiment, and their description is incorporated herein by reference. In this embodiment, end portion 52 includes a transverse end 54 and a substantially planar surface portion 56 extending inwardly from transverse end 54. End portion 52 defines an insert-receiving recess 58 in surface portion 56 which is spaced from transverse end 54 and extends transversely of elongated body 12. Preferably, body 12 has opposed side surfaces and recess 58 extends from one side surface to the other side surface. Also, preferably, body 12 has an arcuate cross-section and recess 58 in surface portion 56 extends chordally of the cross-section of body 12. More preferably recess 58 extends substantially diametrically of the cross-section of body 12. Also preferably in toolholder 50, substantially planar portion 52 defines a pair of spaced apart threaded openings 60 extending into end portion 52, adapted to threadingly receive fastener 26.

In accordance with this embodiment, a small-size insert 40, described above, may be positioned at either end of recess 58, with its shoulder 46 abutting the abutment surface 22 of end portion 52 adjacent correspond to that end of recess 58. As in the case of the first embodiment, the placement of clamping lever 24 on the insert 40 orients insert 40 along its x- and y-axis with respect to the recess, and the shoulder 46 abutting abutment surface 22 orients the insert along the z-axis with respect to the recess. Upon inserting fastener 26 through aperture 30 of clamping lever plate 28 and threading fastener 26 into the one of the pair of openings 60 closest to the end of the recess 58 into which insert 40 has been placed, the insert is readily secured rapidly and rigidly in repeatable orientation in toolholder 50. Toolholder 50, with an insert, such as insert 40, mounted therein is particularly useful for internal boring of workpieces, and either end of recess 58 may be utilized depending on the desired right-hand or left-hand orientation of the insert with respect to the machine tool being utilized.

While a particular embodiment of the grooving and turning insert of the invention has been shown and described, it will be appreciated by those skilled in the art that changes and modifications may be made thereto without departing from the invention in its broader aspects and as set forth in the following claims.

What is claimed is:

1. A toolholder for use with a machine tool and a small-size insert having a body portion having a shoulder extending outwardly from the body portion of the insert, said toolholder comprising:
   a. an elongated body having a transverse end;
   b. an end portion of said toolholder body including said transverse end, said end portion defining a substantially planar surface portion extending inwardly from said transverse end;
   c. said end portion of said toolholder body defining at least one insert-receiving recess in said substantially planar surface portion extending inwardly into said body; and
   d. said end portion of said toolholder body defining at least one planar abutment surface perpendicular to the longitudinal direction of said at least one insert-receiving recess for the shoulder of an insert to position the insert with relation to said toolholder body and said recess and to prevent rearward movement of the insert within the recess.

2. The toolholder of claim 1, wherein said end portion of said toolholder body includes means for securing the insert to said toolholder.

3. The toolholder of claim 1, wherein the at least one insert-receiving recess in said substantially planar surface portion extends inwardly into said toolholder body longitudinally from said transverse end.

4. A toolholder for use with a machine tool and a small-size insert having a body portion having a shoulder extending outwardly from the body portion of the insert, said toolholder comprising:
   a. an elongated body having a transverse end;
   b. an end portion of said body including said transverse end, said end portion defining a substantially planar surface portion extending inwardly from said transverse end;
   c. said end portion defining a plurality of spaced apart insert-receiving recesses in said substantially planar surface portion extending inwardly into said body longitudinally from said transverse end; and
   d. said end portion defining at least one abutment surface for the shoulder of an insert to position the insert with relation to said body and said recess.

5. The toolholder of claim 1, wherein the at least one insert-receiving recess in said substantially planar surface portion extends transversely of said elongated body spaced from said transverse end.

6. The toolholder of claim 5, wherein the elongated body has opposed side surfaces, and said at least one insert-receiving recess extends from one side surface to the other side surface.

7. A toolholder for use with a machine tool and a small-size insert having a body portion having a first generally arcuate surface portion, a second substantially planar portion and a shoulder extending outwardly from the body portion of the insert, said toolholder comprising:
   a. an elongated body having a transverse end;
   b. an end portion of said body defining a substantially planar surface portion extending inwardly from said transverse end;
   c. said end portion defining at least one arcuately-shaped insert-receiving recess in said substantially planar surface portion extending inwardly into said end portion; and
   d. said body providing an abutment for the shoulder of an insert to position the insert with relation to said body and said recess, said abutment being perpendicular to the exterior end of said at least one recess to position the insert with relation to the toolholder body and said recess, and to prevent rearward movement of the insert within the recess.

8. The toolholder of claim 7, wherein the at least one insert-receiving recess in said substantially planar surface portion extends inwardly into said body longitudinally from said transverse end.

9. The toolholder of claim 8, wherein said end portion defines a plurality of spaced apart arcuately-shaped insert-receiving recesses in said substantially planar surface portion extending inwardly into said body longitudinally from said transverse end, and said body providing an abutment for the shoulder of an insert for each of the plurality of insert-receiving recesses, each of said abutments being perpendicular to the exterior end of each of said recesses to position an insert with relation to the toolholder body and said recess, and to prevent rearward movement of the insert within the recess.

10. The toolholder of claim 7, wherein the at least one insert-receiving recess in said substantially planar surface portion extends transversely of said elongated body spaced from said transverse end.

11. A toolholder for use with a machine tool and a small-size insert having a body portion having a first generally arcuate surface portion, a second substantially planar and a shoulder extending outwardly from the body portion of the insert, said toolholder comprising:
 a. an elongated body having a transverse end and opposed side surfaces;
 b. an end portion of said body defining a substantially planar surface portion extending inwardly from said transverse end;
 c. said end portion defining at least one arcuately-shaped insert-receiving recess in said substantially planar surface portion extending into said end portion from one side surface to the other side surface; and
 d. said body of said toolholder providing an abutment for the shoulder of an insert to position the insert with relation to said body and said recess.

12. The toolholder of claim 10, wherein the elongated body has an arcuate cross-section, and said at least one insert-receiving recess extends transversely chordally of said body.

13. The toolholder of claim 10, wherein said at least one insert-receiving recess extends substantially diametrically of said body.

14. The toolholder of claim 7, wherein said end portion includes means for securing the insert to said toolholder.

15. The toolholder of claim 14, wherein said means for securing the insert to said toolholder comprises a threaded opening in said substantially planar surface portion extending into said end portion.

16. The toolholder of claim 14, wherein said means for securing the insert to said toolholder comprises a clamping device whereby the insert is clamped to the toolholder.

17. The toolholder of claim 14, wherein said means for securing the insert to said toolholder comprises a threaded opening in said substantially planar surface portion extending into said end portion, a clamping lever adapted to receive a fastener therethrough, and a fastener adapted to cooperate with the clamping lever and the threaded opening in the substantially planar surface portion, to thereby secure the insert to the tool holder between the clamping lever and the said substantially planar surface portion of the body.

18. A toolholder for use with a machine tool and a small-size insert having a body portion having a first generally arcuate surface portion, a second substantially planar portion and a shoulder extending outwardly from the body portion of the insert, said toolholder comprising:
 a. an elongated body having a first generally arcuate surface portion, extending along its length and forming a pair of opposing longitudinal edges, and a second substantially planar portion along the length of the body forming a pair of opposing longitudinal edges, each of which are contiguous with one longitudinal edge of the first generally arcuate portion, and a substantially planar transverse end;
 b. an end portion of said body defining a substantially planar surface portion extending inwardly from said transverse end;
 c. said end portion defining at least one arcuately-shaped insert-receiving recess in said substantially planar surface portion extending inwardly into said body; and
 d. said body of said toolholder providing a planar abutment perpendicular to the longitudinal axis of said at least one insert-receiving recess for the shoulder of an insert to position the insert with relation to said body and said recess, and to prevent rearward movement of the insert within the recess.

19. The toolholder of claim 18, wherein the at least one insert-receiving recess in said substantially planar surface portion extends inwardly into said body longitudinally from said transverse end.

20. The toolholder of claim 19, wherein said end portion defines a plurality of spaced apart insert-receiving recesses in said substantially planar surface portion extending inwardly into said body longitudinally from said transverse end, and said body providing an abutment for the shoulder of an insert for each of the plurality of insert-receiving recesses, each of said abutments being perpendicular to the exterior end of each of said recesses to position an insert with relation to the toolholder body and said recess, and to prevent rearward movement of the insert within the recess.

21. The toolholder of claim 18, wherein the at least one insert-receiving recess in said substantially planar surface portion extends transversely chordally of said elongated body spaced from said transverse end.

22. The toolholder of claim 18, wherein said at least one insert-receiving recess extends substantially diametrically of said body.

* * * * *